United States Patent
Spruit et al.

(10) Patent No.: US 11,428,819 B2
(45) Date of Patent: Aug. 30, 2022

(54) LASER SENSOR FOR PARTICLE DETECTION

(71) Applicant: TRUMPF PHOTONIC COMPONENTS GMBH, Ulm (DE)

(72) Inventors: Johannes Hendrikus Maria Spruit, Waalre (NL); Alexander Marc Van Der Lee, Venlo (NL); Gerben Kooijman, Leende (NL); Okke Ouweltjes, Veldhoven (NL); Joachim Wilhelm Hellmig, Valkenswaard (NL); Arnoldus Johannes Martinus Jozeph Ras, Brabant (NL); Petrus Theodorus Jutte, Weert (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 950 days.

(21) Appl. No.: 16/300,617

(22) PCT Filed: May 12, 2017

(86) PCT No.: PCT/EP2017/061422
§ 371 (c)(1),
(2) Date: Nov. 12, 2018

(87) PCT Pub. No.: WO2017/198555
PCT Pub. Date: Nov. 23, 2017

(65) Prior Publication Data
US 2019/0285753 A1    Sep. 19, 2019

(30) Foreign Application Priority Data
May 19, 2016    (EP) .................... 16170311

(51) Int. Cl.
*G01S 17/95*    (2006.01)
*G01N 15/02*    (2006.01)
(Continued)

(52) U.S. Cl.
CPC .......... *G01S 17/95* (2013.01); *G01N 15/0205* (2013.01); *G01N 15/06* (2013.01);
(Continued)

(58) Field of Classification Search
CPC ...... G01S 17/95; G01S 7/4812; G01S 7/4817; G01S 7/4916; G01S 7/497; G01S 17/58;
(Continued)

(56) References Cited

U.S. PATENT DOCUMENTS

2008/0281528 A1* 11/2008 Relle Jr ............... G01N 1/2273
                                                         702/19
2011/0007299 A1   1/2011 Moench et al.
(Continued)

FOREIGN PATENT DOCUMENTS

WO           0237410 A1    5/2002

OTHER PUBLICATIONS

Wikipedia contributors. "Bernoulli's principle." Wikipedia, The Free Encyclopedia. Wikipedia, The Free Encyclopedia, Nov. 1, 2021. Web. Nov. 5, 2021. (Year: 2021).*
(Continued)

*Primary Examiner* — Luke D Ratcliffe
*Assistant Examiner* — Sanjida Naser
(74) *Attorney, Agent, or Firm* — Leydig, Voit & Mayer, Ltd.

(57) ABSTRACT

The invention describes a laser sensor or laser sensor module (100) using self-mixing interference for particle density detection, a related method of particle density detection and a corresponding computer program product. The invention further relates to devices comprising such a laser sensor or laser sensor module. It is a basic idea of the present invention to detect particles by means of self-mixing interference signals and determine a corresponding particle density. In addition at least a first parameter related to at least one velocity component of a velocity vector of the particles is determined in order to correct the particle density if there is the relative movement between a detection volume and the particles. Such a relative movement may for example be
(Continued)

related to a velocity of a fluid transporting the particles (e.g. wind speed). Furthermore, it is possible to determine at least one velocity component of the velocity of the particles based on the self-mixing interference signals.

18 Claims, 9 Drawing Sheets

(51) Int. Cl.
| | | |
|---|---|---|
| *G01N 15/06* | (2006.01) | |
| *G01S 7/481* | (2006.01) | |
| *G01S 7/4912* | (2020.01) | |
| *G01S 17/58* | (2006.01) | |
| *G01S 17/87* | (2020.01) | |
| *G01S 7/497* | (2006.01) | |

(52) U.S. Cl.
CPC .......... *G01S 7/4812* (2013.01); *G01S 7/4817* (2013.01); *G01S 7/497* (2013.01); *G01S 7/4916* (2013.01); *G01S 17/58* (2013.01); *G01S 17/87* (2013.01); *G01N 2015/0693* (2013.01); *Y02A 90/10* (2018.01)

(58) Field of Classification Search
CPC .... G01S 17/87; G01N 15/0205; G01N 15/06; G01N 2015/0693; Y02A 90/10
See application file for complete search history.

(56) References Cited

U.S. PATENT DOCUMENTS

| | | |
|---|---|---|
| 2013/0063718 A1 | 3/2013 | Bernal et al. |
| 2014/0085635 A1 | 3/2014 | Van Der Lee et al. |
| 2015/0077735 A1* | 3/2015 | Zamama ................ G01S 17/95 356/28 |
| 2016/0313243 A1* | 10/2016 | Dittrich .............. G01N 15/1434 |

OTHER PUBLICATIONS

Wikipedia contributors. "Boyle's law." Wikipedia, The Free Encyclopedia. Wikipedia, The Free Encyclopedia, Jul. 30, 2021. Web. Nov. 5, 2021. (Year: 2021).*

The immersed boundary-lattice Boltzmann methods for solving fluid-particles interaction problems (Year: 2003).*

Giuliani, G; Norgia, M.; Donati, S. & Bosch, T. , Laser diode self-mixing technique for sensing applications, Journal of Optics A: Pure and Applied Optics, 2002, 4, S. 283-S. 294.

Sudol S et al: "Quick and easy measurement of particle size of Brownian particles and planktons in water using a self-mixing laser", Optics Express,, vol. 14, No. 3,Feb. 6, 2006 (Feb. 6, 2006), pp. 1044-1054.

Tektronix: "Features Specs Ordering Information Pricing Information Print Data Sheet (166kB) Request a Quote Real-time Spectrum Analyzer Characteristics Frequency Related", Mar. 8, 2000.

* cited by examiner

LASER SENSOR FOR PARTICLE DETECTION

CROSS-REFERENCE TO PRIOR APPLICATIONS

This application is the U.S. National Phase application under 35 U.S.C. § 371 of International Application No. PCT/EP2017/061422, filed on May 12, 2017, which claims the benefit of EP Patent Application No. EP 16170311.1, filed on May 19, 2016. These applications are hereby incorporated by reference herein.

FIELD OF THE INVENTION

The invention relates to a laser sensor or laser sensor module using self-mixing interference for particle density detection, a related method of particle density detection and a corresponding computer program product. The invention further relates to devices comprising such a laser sensor or laser sensor module.

BACKGROUND OF THE INVENTION

CN102564909 A discloses a laser self-mixing multi-physical parameter measurement method and a laser self-mixing multi-physical parameter measurement device for atmospheric particulate matter. The laser self-mixing multi-physical parameter measurement device comprises a microchip laser, a collimating lens, a beam splitter, converging lenses, a photodetector, an amplifier, a data acquisition card and a spectrum analyzer. The described methods and devices are complicated and expensive.

SUMMARY OF THE INVENTION

It is an object of the present invention to provide an improved laser sensor module for particle density detection.

According to a first aspect a laser sensor module for particle density detection is presented. The laser sensor module comprises at least one first laser, at least one first detector, at least one electrical driver and at least one evaluator. The first laser is adapted to emit first laser light in reaction to signals provided by the at least one electrical driver. The at least one first detector is adapted to determine a first self-mixing interference signal of an optical wave within a first laser cavity of the first laser. The first self-mixing interference signal is caused by first reflected laser light reentering the first laser cavity. The first reflected laser light is reflected by a particle receiving at least a part of the first laser light. The evaluator is adapted to determine at least one first parameter being related to a first velocity component of the particle relative to the laser sensor module. The first parameter is determined based on the first self-mixing interference signal. The evaluator is adapted to determine a particle density based on the first self-mixing interference signal. The evaluator is adapted to correct the particle density by means of the first parameter.

The first laser may preferably be adapted to emit laser light with wavelength above 750 nm in the infrared range of the spectrum, most preferably between 780 nm and 1300 nm of the wavelength spectrum.

The first laser may be a semiconductor laser as side emitter or Vertical Cavity Surface Emitting laser (VCSEL).

The electrical driver is adapted to provide any driving scheme or current modulation which is suitable to detect particles and the first parameter being related to the first velocity component. Examples of such driving schemes or current modulation are, for example, constant current, triangular current or rectangular current.

The first parameter is preferably related by a one-to-one relationship to the first velocity component. The particle density is determined by determining several particles within a predetermined time period in order to get a reliable particle density. The time to determine the particle density may be reduced by means of a second, third, fourth or more lasers which may be comprised by the laser sensor module. The laser sensor module preferably comprises a one-dimensional or two dimensional laser array with a multitude of lasers. Each laser may comprise an integrated detector in order to determine the presence of a particle. Alternatively, there may be a common detector measuring, for example, the impedance across the laser cavities of the lasers. The common detector may be adapted to identify each laser and the corresponding impedance or measurement signal. Using a multitude of lasers increases a detection volume and thus the likelihood to detect a particle. The number of lasers and optionally corresponding detectors may be adapted depending on the expected particle density. In cases in which a high particle density is expected a single laser may be sufficient. At lower particle densities two, three or more lasers may be used in order to get an acceptable measurement time. In addition first self-mixing interference signals which are caused by the measurement of different particles may be used in order to determine the first parameter in a reliable way. The number of particles which have to be measured within a predefined time period may relate to the distribution of the first parameter (first velocity component). A low number of measurements may be sufficient if there is a narrow distribution of the first parameter. A higher number of measurements may be needed if there is a broader distribution of the first parameter. The laser sensor module may comprise processors or microprocessors and corresponding data storage devices which are adapted by means of corresponding software code to apply statistical methods in order to determine the number of particles which are needed to determine the particle density and/or the first parameter in a reliable way. Alternatively, a predefined time period may be provided or preprogrammed defining the measurement time, and depending on the expected particle density the statistical significance of the measured values.

The first parameter may further be used to determine the first velocity component. The first velocity component (or the corresponding average value) may be related in a known way to a total velocity of the fluid comprising the particles such that the first velocity component can be used to determine the total velocity by means of the first self-mixing interference signal. And known relationship between the first velocity component and the total velocity may, for example, be given, if a direction of fluid flow of the fluid (e.g. air) comprising the particles relative to the laser sensor module or more specific an optical axis of the first laser (or the optical axes of the multitude of lasers) is known.

The correction of the particle density by means of the first parameter is needed because the velocity of the fluid comprising the particles determines the measurement volume which is scanned by means of the first laser (or the laser array) in a predetermined period of time. The higher the velocity the bigger is the measurement volume. A high wind speed may therefore result in particle density which is too high if the reference volume is taken at zero wind speed.

The laser sensor module may be adapted to provide the first self-mixing interference signal for different detection volumes, wherein the evaluator is adapted to determine the first parameter based on the first self-mixing interference signal generated by means of reflected first laser light reflected at different detection volumes. Different detection volumes mean in this respect that at least a part of the detection volumes does not overlap.

The laser sensor module may preferably comprise an optical manipulator. The optical manipulator may be adapted to provide the first self-mixing interference signal for the different detection volumes. The evaluator may be adapted to determine the first parameter based on the first self-mixing interference signal generated by means of reflected first laser light reflected at different detection volumes.

The optical manipulator may be adapted to provide a different relation between a direction of the first laser light at the respective detection volume and the direction of movement of the particles. This different relation may be used to determine the first parameter. The optical manipulator may, for example, be a transparent block with multiple reflective surfaces. The reflectivity of the different reflective surfaces may be switchable. The first laser light may enter the transparent block via an entrance window and leave the transparent block via a surface with negligible reflectivity (reflectivity switched off). In general it is sufficient that the detection volume changes its relative position with respect to the direction of movement of the particles in a known way. In an alternative embodiment the first laser may be moved in order to change the detection volume. The first laser or a laser array comprising the first laser may, for example, be arranged on top of a MEMS device which may be controlled by means of a controller in order to change the relative position of the detection volume.

The optical manipulator may preferably comprise a mirror arrangement. The mirror arrangement may preferably comprise a first movable mirror for redirecting the first laser light, wherein the evaluator is adapted to determine the first parameter based on the first self-mixing interference signal received at different stages of movement of the first movable mirror. Knowledge about the movement of the first moveable mirror comprises knowledge about the spot position and thereby the spot velocity.

The evaluator determines the particle density based on the received first self-mixing interference signal and corrects the particle density based on the measurement results. The first velocity component is in this case not explicitly determined but it is indirectly comprised in a variation of the particle density which is caused by the movement of the first movable mirror. The laser sensor module may this case be adapted to apply a correction algorithm which is related to the movement of the movable mirror relative to a direction of movement of the particles.

The first movable mirror may be adapted to move around a rotation axis. The movement around the rotation axis comprises any kind of non-linear movement around the rotation axis (rotation as such, oscillation etc.). The evaluator may be adapted to determine the first parameter based on the first self-mixing interference signal received at at least two different phase angles of the movable mirror. A first optical device may be used to focus the first laser light to a focus region within the respective detection volume. By means of the at least two different phase angles only information or first parameters may be obtained which are related to a velocity parallel to a direction of the movement of the beam of the first laser light by means of the movable mirror. This information may be sufficient in such cases where the direction of movement of the particles relative to the laser sensor module or first laser is known as described above.

The moveable mirror may in an alternative approach be adapted to move around two axes.

The laser sensor module may be preferably adapted to oscillate with a predefined oscillation frequency around the rotation axis. The evaluator is preferably adapted to determine the first parameter at at least three different phase angles of the movable mirror. Knowledge of the first parameter at three different phase angles or more general at three different relative positions or ranges of the detection volumes with respect to the direction of movement of the particles may enable determination of the total velocity vector of the particles.

The evaluator may in this case be adapted to determine the first velocity component and a second velocity component of the particle relative to the laser sensor module based on the first parameter determined at the at least three different phase angles of the movable mirror. In addition to the first parameter, for example, the modulation frequency of the mirror, the angular deflection amplitude and distance of the detection volume or measurement spot to the movable mirror may be used in order to determine the first and the second velocity component. The laser sensor module may, for example, be used in an anemometer in order to determine wind speed.

The laser sensor module may further comprise at least one first optical device for focusing the first laser light to a first focus region. The first optical device may comprise a lens or a lens arrangement. The first optical device may further comprise an optical unit which is adapted to deflect the first laser light. The first optical device may be adapted to focus first, second, third, fourth etc. laser light which is emitted by an laser array comprising the first laser to a first, second, third, fourth etc. focus region. The focus region determines the detection volume from which a detectable feedback can be received in order to generate the self-mixing interference signal. The first optical device may comprise a multitude of lenses for focusing the multitudes of laser beams. The first optical device may alternatively comprise, for example, an integrated array of micro-lenses. The lenses or micro-lenses may in addition be adapted to spread the detection volumes by deflecting the individual laser beams in different directions. The first optical device main in an alternative approach comprise an additional optical unit which may be adapted to spread the laser beams (first laser light, second laser light, third laser light etc.) of the different lasers of the laser array to different focus regions by deflecting the laser beams in different directions.

The laser sensor module may comprise at least a second laser. The second laser may be adapted to emit second laser light in a second emission direction different than a first emission direction in which the first laser light is emitted. The second detector may be adapted to determine a second self-mixing interference signal of an optical wave within a second laser cavity of the second laser. The second self-mixing interference signal is caused by second reflected laser light reentering the second laser cavity, the second reflected laser light being reflected by a particle receiving at least a part of the second laser light. The evaluator is adapted to determine at least one second parameter being related to a second velocity component of the particle relative to the laser sensor module. The second parameter is determined based on the second self-mixing interference signal. The evaluator is further adapted to correct the particle density by means of the first and second parameter.

The particle detected by means of the second laser may be the same particle as the particle detected by the first laser or a different particle. The first laser may in this case detect a first particle and the second laser may detect in this case a second particle different than the first particle.

The first detector may be used in order to analyze or evaluate the first and the second self-mixing interference signal. The laser sensor module may preferably comprise a second detector in order to determine the second self-mixing interference signal independently from the first self-mixing interference signal. The laser sensor module may comprise more than two lasers, for example, a multitude of lasers which may be integrated in a one-dimensional or two dimensional laser array as described above. The laser sensor module may in this case be adapted to generate a multitude of laser beams in parallel and to determine a multitude of self-mixing interference signals independently from each other. The laser sensor module may in this case detect self-mixing interference signals which are caused by three, four, or more particles.

The evaluator may be further adapted to determine the first velocity component and a second velocity component of the particle relative to the laser sensor module based on the first parameter and the second parameter.

The evaluator may be further adapted to determine a total velocity vector of the particles based on the first parameter, the second parameter, a third parameter or even more parameters if there are a third laser, a fourth laser or more lasers. The evaluator may be adapted to determine the velocity components and/or the total velocity vector by means of the theoretical model in which it may, for example, be assumed that the particle or particles are comprised by a laminar flow.

The evaluator may be further adapted to determine a particle size of the particle based on the first self-mixing interference signal. The evaluator may be further adapted to determine a particle size distribution by means of the determination of the size of multiple of particles. Particle size detection may be combined with any embodiment of the laser sensor module as described above.

According to a further aspect an air conditioning system is presented. The air conditioning system comprises at least one laser sensor module as described above. The at least one laser sensor module may be adapted to determine an air quality and/or air velocity. The term "air conditioning system" comprises every device or system which is adapted to provide air of at least a minimum quality. An air conditioner may comprise an air conditioning system as described above. A vacuum cleaner may comprise an air conditioning system as described above.

The laser sensor module may be useful in each application or device which comprises a filter or filters for filtering a fluid, especially air. The laser sensor module may be used to determine the particle density and the velocity of the fluid (e.g. air) flow. The velocity may be used in order to determine whether a filter or filters have to be cleaned or replaced. A contaminated filter or filter system may be characterized by a higher flow resistance such that the velocity of the fluid reduces.

The laser sensor module may according to a further aspect be part of a particle detector which may be used to determine air quality. Such a particle detector may, for example, be integrated in mobile devices especially in mobile communication devices. The laser sensor module may be a separate device which can be integrated, for example, in mobile devices or at least a part of the functions of the laser sensor module may be performed by means of the infrastructure provided by the mobile device. Especially all or part of the functionalities of the evaluator may be provided by means of one or more processors of the mobile device. Software code may be stored in the storage device of the mobile device in order to enable, for example, at least a part of the functionalities of the evaluator.

According to a further aspect a sensor device is presented. The sensor device comprises at least one laser sensor module as described above. The sensor device further comprising at least one communication interface. The at least one laser sensor module may be adapted to determine an air quality and/or an air velocity. The sensor device may be adapted to enable access to data related to the determined air quality and/or air velocity by means of the communication interface.

The sensor device may be integrated in a communication network such that the data can be accessed by means of the communication network. Communication network comprises each network which is adapted to distribute information. This may, for example, be a mobile communication network as a GSM, UMTS, LTE communication system. Communication network further comprises the Internet and local networks especially wireless networks which may be, for example, based on the WLAN technology and the like. Communication network may also comprise each interaction between different network technologies as mobile communication networks, the Internet or local area networks. The sensor device may be an Internet of things device which can be accessed by means of different communication protocols and network technologies. The communication interface may alternatively or in addition be adapted to communicate by means of peer-to-peer network technology (e.g. Bluetooth). It may, for example, be possible to communicate with the sensor device by means of Bluetooth using a mobile communication device like a smart phone or the like. The mobile communication device may be enabled, for example, by means of a corresponding software application to communicate with the sensor device in order to receive the data. The data may comprise particle density, particle size or particle size distribution, wind speed, wind direction and so on. The sensor device may for example be integrated or coupled to a light pole or similar constructions in order to enable determination of data at multiple points, for example, within a town or country.

According to a further aspect a method of particle density detection is presented. The method comprises the steps of:
  emitting first laser light by means of a first laser,
  receiving in a first laser cavity of the first laser first reflected laser light being reflected by a particle receiving at least a part of the first laser light,
  determining a first self-mixing interference signal of an optical wave within the first laser cavity of the first laser, wherein the first self-mixing interference signal is caused by the first reflected laser light reentering the first laser cavity,
  determining based on the first self-mixing interference signal at least one first parameter being related to a first velocity component of the particle relative to the laser sensor module,
  determining a particle density based on the first self-mixing interference signal,
  correcting the particle density by means of the first parameter.

The steps of the method are not necessarily performed in the order as presented above.

According to a further aspect a computer program product is presented. The computer program product comprises code means which can be saved on at least one memory device of the laser sensor module according to any one of claims 1 to 10 or on at least one memory device of a device comprising the laser sensor module. The code means being arranged such that the method according to claim 14 can be executed by means of at least one processing device of the laser sensor module according to any one of claims 1 to 10 or by means of at least one processing device of the device comprising the laser sensor module. The memory device or the processing device may be comprised by the laser sensor module (e.g. electrical driver, evaluator etc.) or the device comprising the laser sensor module. A first memory device and/or first processing device of the device comprising the laser sensor module may interact with a second memory device and/or second processing device comprised by the laser sensor module.

It shall be understood that the laser sensor module according to any one of claims 1 to 10 and the method of claim 14 have similar and/or identical embodiments, in particular, as defined in the dependent claims.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principal sketch of a first laser sensor module

FIG. 2 shows a principal sketch of a second laser sensor module

FIG. 3 shows a principal sketch of a third laser sensor module

FIG. 4 shows a principal sketch of a fourth laser sensor module

Figure 5:
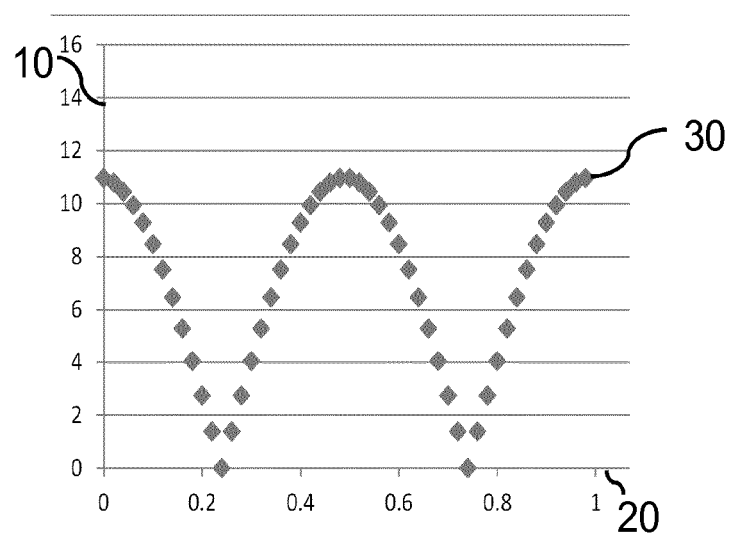
Figure 6:
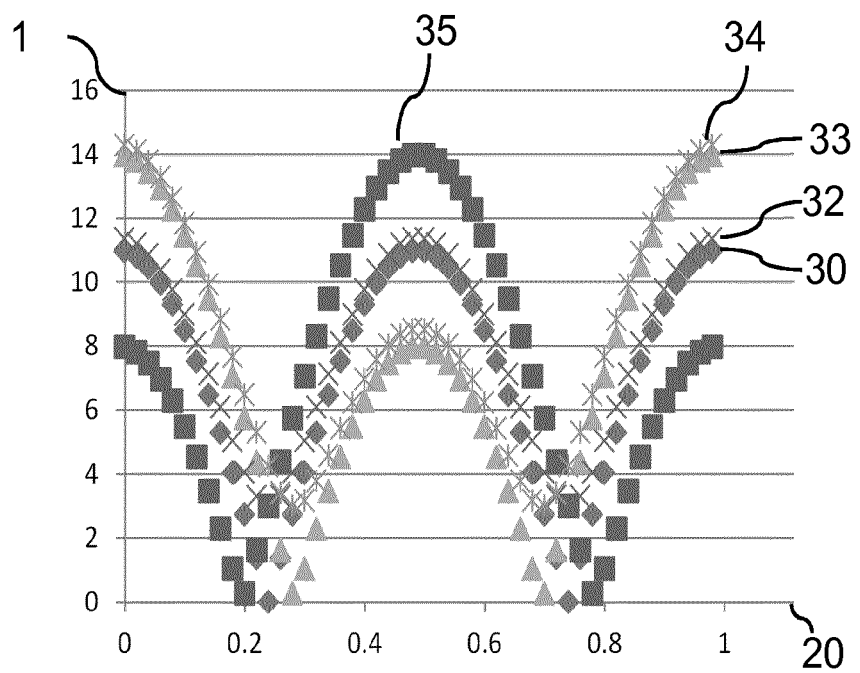
Figure 7:
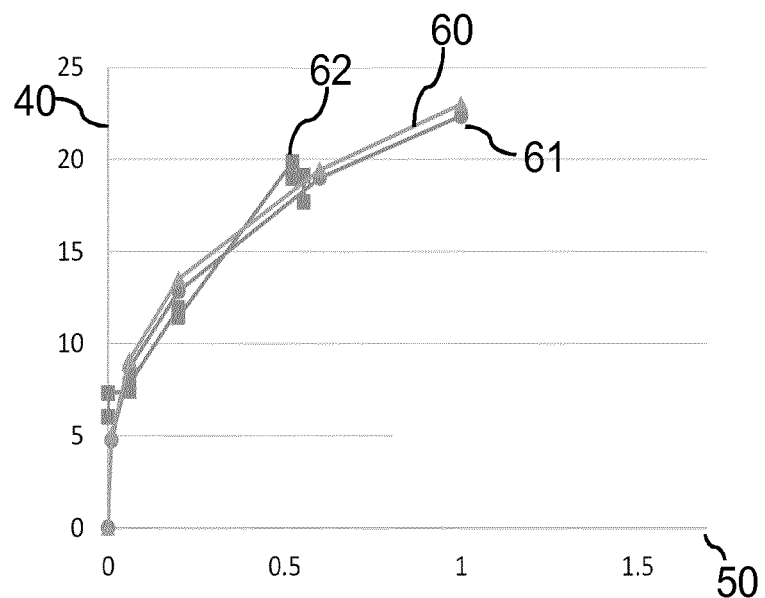
Figure 8:
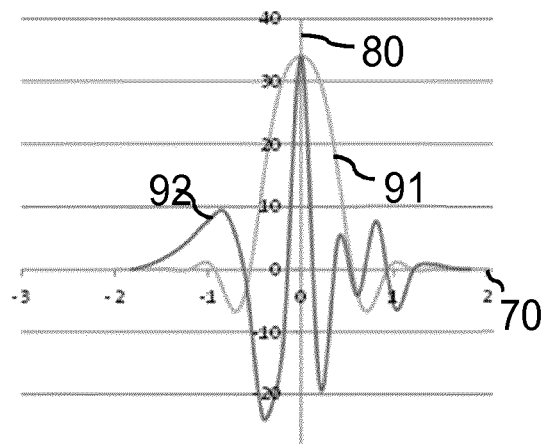
Figure 9:
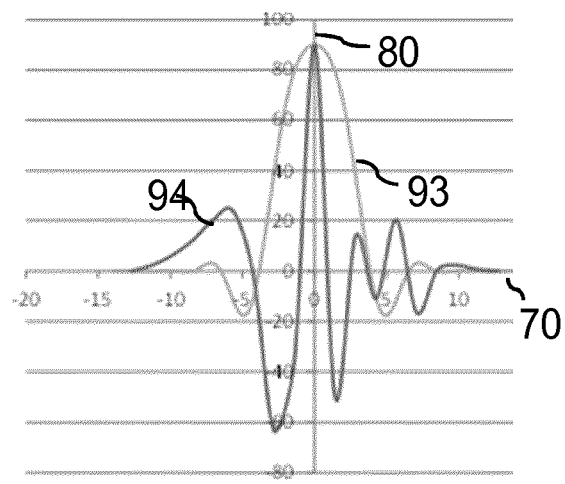
Figure 10:
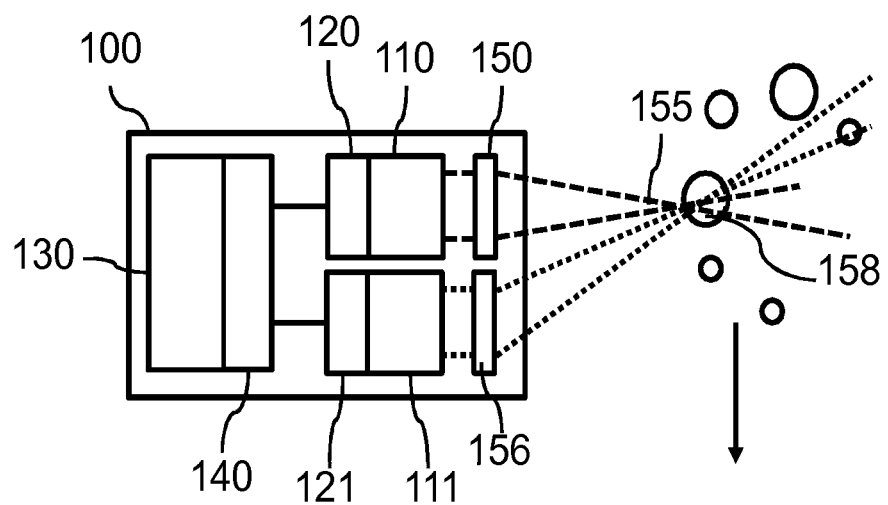
Figure 11:
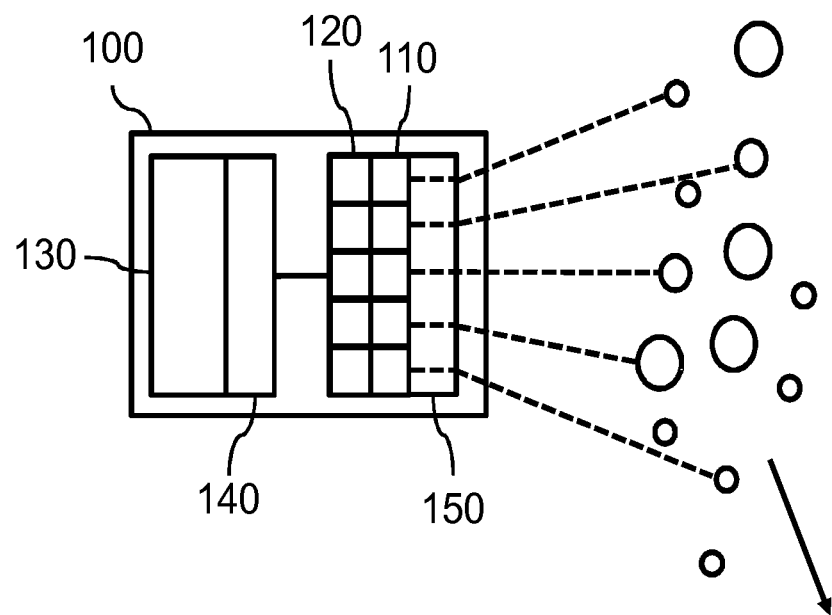
Figure 12:
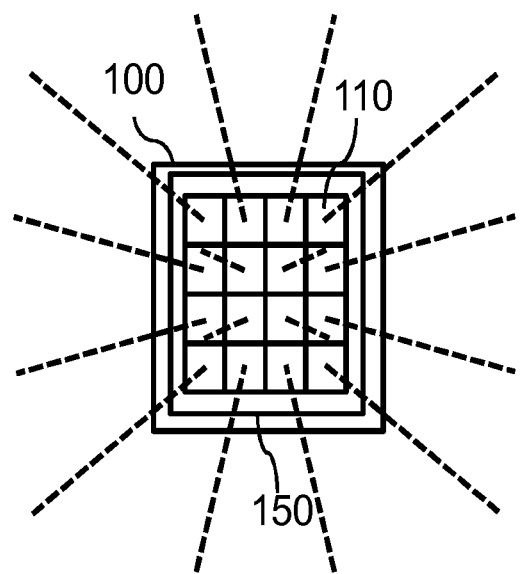
Figure 13:
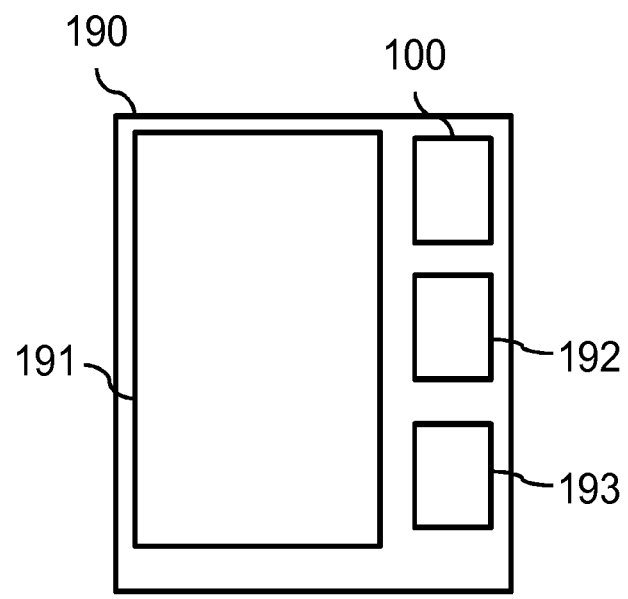
Figure 14:
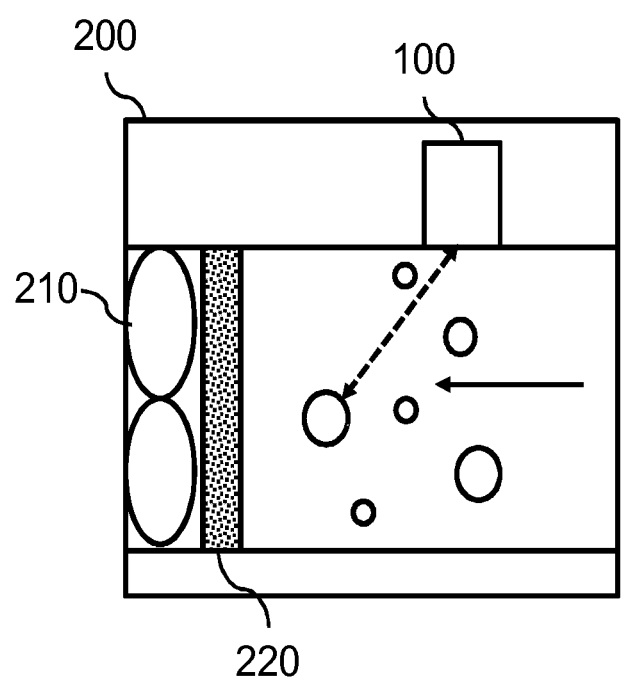
Figure 15:
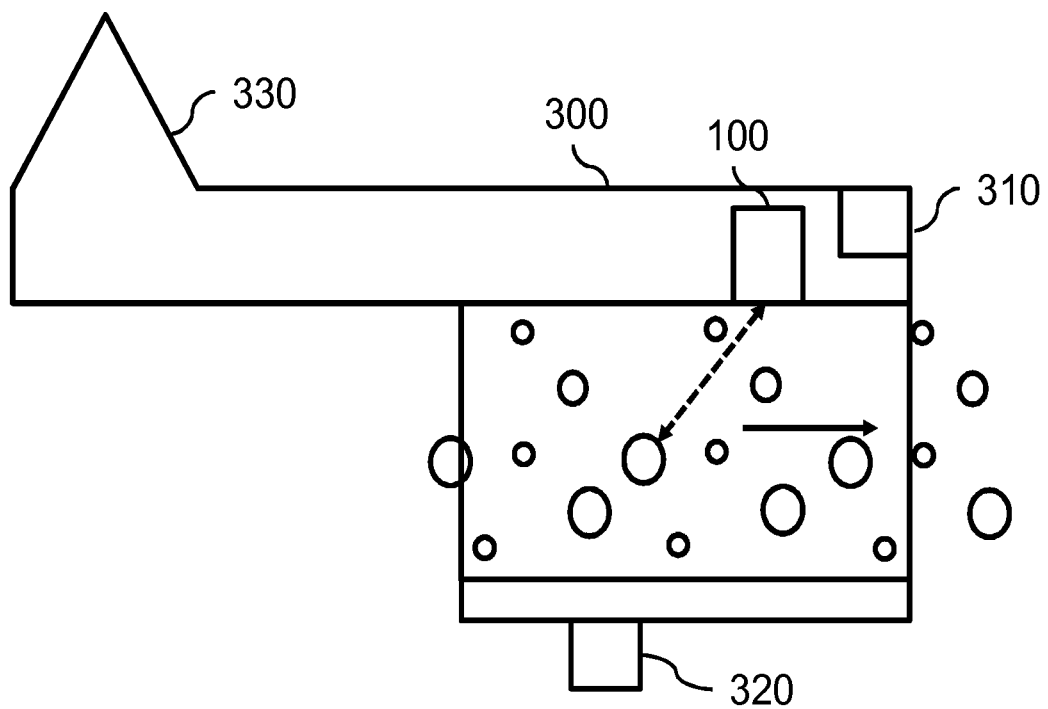
Figure 16:
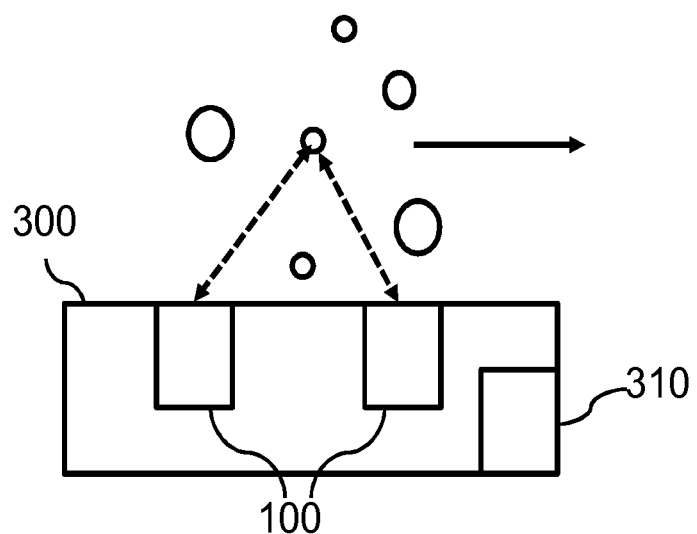
Figure 17:
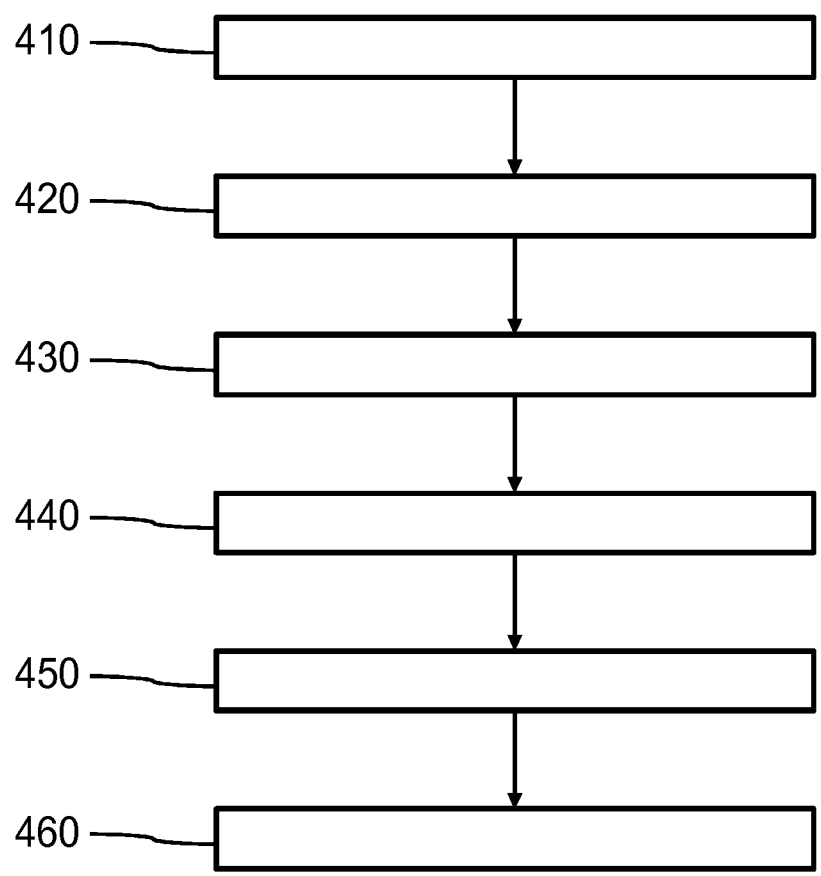

FIG. 5 shows a first graph showing particle count depending on the phase angle of a movable mirror FIG. 6 shows a second graph showing particle count depending on the phase angle of the movable mirror FIG. 7 shows a comparison of theoretical calculations and experimental measurement results FIG. 8 shows a first self-mixing interference signal at a velocity of 7 m/s FIG. 9 shows a first self-mixing interference signal at a velocity of 1 m/s FIG. 10 shows a principal sketch of a fifth laser sensor module FIG. 11 shows a principal sketch of sixth laser sensor module FIG. 12 shows the top view of a principal sketch of a seventh laser sensor module FIG. 13 shows a principal sketch of a mobile communication device FIG. 14 shows a principal sketch of an air conditioning system FIG. 15 shows a principal sketch of a first sensor device FIG. 16 shows a principal sketch of a second sensor device FIG. 17 shows a principal sketch of a method of particle density detection In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410. The disclosure regarding the detection of distance and movement in International Patent Application No. WO 02/37410 is incorporated by reference.

The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens, for example, a plano-convex lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser can be detected by a photo diode, provided for this purpose, which diode converts the radiation variation into an electric signal, and electronic circuitry is provided for processing this electric signal.

Movement of the object relative to the measuring beam causes the radiation reflected thereby to undergo a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in this cavity. Dependent on the amount of phase shift between the optical wave and the radiation re-entering the cavity, the interference will be constructive or negative, i.e. the intensity of the laser radiation is increased or decreased periodically. The frequency of the laser radiation modulation generated in this way is exactly equal to the difference between the frequency of the optical wave in the cavity and that of the Doppler-shifted radiation re-entering the cavity. The frequency difference is of the order of a few kHz to MHz and thus easy to detect. The combination of the self-mixing effect and the Doppler shift causes a variation in behavior of the laser cavity; especially its gain or light amplification varies. The impedance of the laser cavity or the intensity of the radiation emitted by the laser may, for example, be measured, and not only can the amount of movement of the object relative to the sensor (i.e. distance traveled) be evaluated, but the direction of movement can also be determined, as described in detail in International Patent Application No. WO 02/37410.

Figure 1:
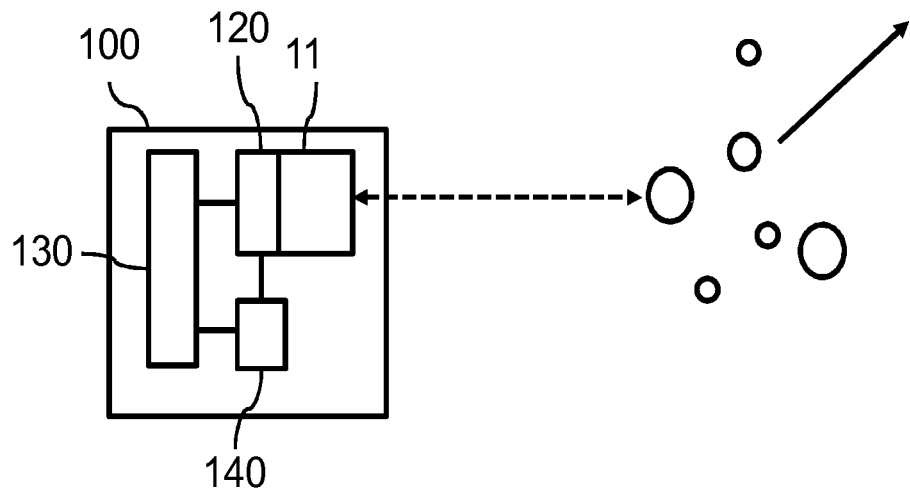

FIG. 1 shows a principal sketch of a first laser sensor module 100. The first laser sensor module comprises a first laser 110 with an integrated first detector 120. The integrated first detector 120 is an integrated photodiode which is part of the layer structure of the first laser 110. The integrated photodiode determines oscillations of the optical wave within the first laser cavity of the first laser. The first laser sensor module 100 further comprises an electrical driver 130 and an evaluator 140. The evaluator 140 is connected to the first laser 110 or more precisely the first detector 120 and the electrical driver 130. The electrical driver 130 supplies electrical power to the first laser 110 in order to emit first laser light. The first laser 110 is in this case a vertical cavity surface emitting laser (VCSEL) with integrated photodiode. The laser sensor module 100 is connected to a power supply (not shown) which provides the power which is modulated and supplied by means of the electrical driver 130. The electrical driver 130 provides an alternating order of different modulation schemes to the first laser 110. A constant current is provided in a first modulation scheme. A driving current with a triangular modulation scheme is provided in a second modulation scheme. The triangular modulation scheme is used to determine the relative distance between the first laser 110 and the particle and optionally the first velocity component by means of the first self-mixing interference signal. The constant current is used to determine the first velocity component which is in this case identical with the first parameter. The evaluator 140 receives electrical signals provided by the first detector 120 which are caused by the first self-mixing interference signal. The evaluator 140 further receives information regarding the driving scheme from electrical driver 130. The evaluator 140 is enabled by means of this information to determine the relative distance between the first laser 110 and the first velocity component. The arrow indicates a direction of movement of the particles. Determination of only the first velocity component may be suitable in cases in which the direction of movement relative to the beam of the first laser light is known. In this case it is, for example, possible to determine the total speed of the particles by means of the first velocity component and the known relationship.

Figure 2:
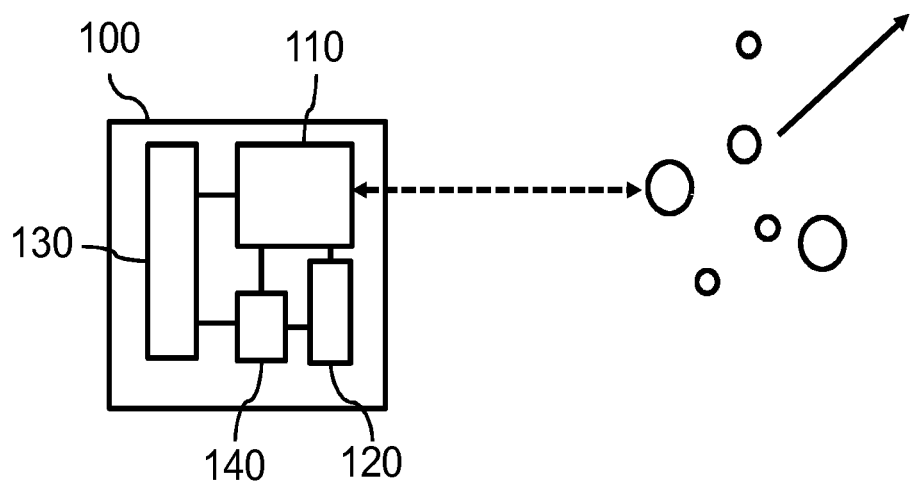

FIG. 2 shows a principal sketch of a second laser sensor module 100. The second laser sensor module comprises a first laser 110. A second detector 120 is arranged as an external measurement circuit which determines the voltage across the first laser cavity or more generally the impedance of the first laser cavity which is influenced by the first self-mixing interference signal. The first laser sensor module 100 further comprises an electrical driver 130 and an evaluator 140. The evaluator 140 is connected to the first laser 110, the first detector 120 and the electrical driver 130. The electrical driver 130 supplies electrical power to the first laser 110 in order to emit first laser light. The first laser 110 is in this case a side emitting semiconductor laser. The laser sensor module 100 is connected to a power supply (not shown) which provides the power which is modulated and supplied by means of the electrical driver 130. The laser sensor module 100 is connected to a power supply (not shown) which provides the power which is modulated and supplied by means of the electrical driver 130. The electrical driver 130 provides a constant current which is used to determine presence of a particle and the first velocity component of the determined particle. The evaluator 140 receives electrical signals provided by the first detector 120 which are caused by the first self-mixing interference signal. The evaluator 140 receives information from the electrical driver 130. The evaluator 140 further receives temperature information from the first laser device. The evaluator 140 is enabled by means of this information to determine presence of particles and the first velocity component which is in this case identical with the first parameter. The arrow indicates a direction of movement of the particles. Determination of only the first velocity component may be suitable in cases in which the direction of movement relative to the beam of the first laser light is known. In this case it is, for example, possible to determine the total speed by means of the first velocity component.

Figure 3:
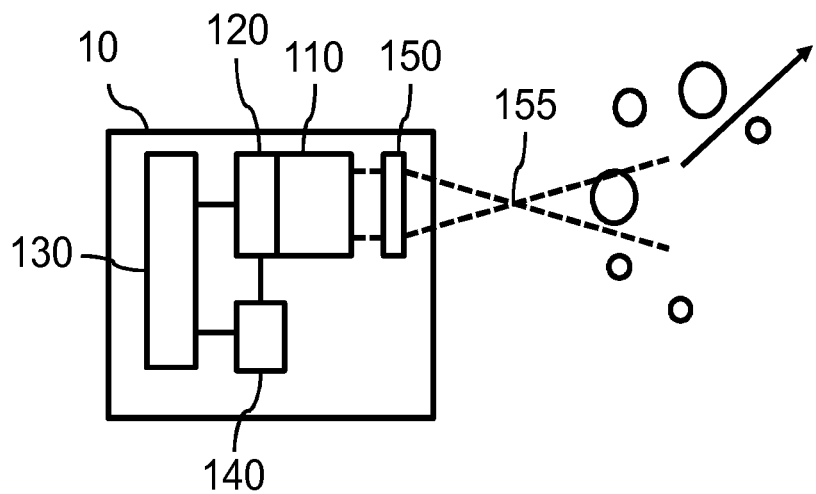

FIG. 3 shows a principal sketch of a third laser sensor module 100. The third laser sensor module comprises a first laser 110 with an integrated first detector 120. The integrated first detector 120 is an integrated photodiode which is part of the layer structure of the first laser 110. The third laser sensor module 100 further comprises an electrical driver 130, and evaluator 140 and a first optical device 150. The evaluator 140 is connected to the first laser 110 or more precisely the first detector 120 and the electrical driver 130. The electrical driver 130 supplies electrical power to the first laser 110 in order to emit first laser light. The first laser 110 is in this case a vertical cavity surface emitting laser (VCSEL) with integrated photodiode. The laser sensor module 100 is connected to a power supply (not shown) which provides the power which is modulated and supplied by means of the electrical driver 130. The electrical driver 130 provides an alternating order of different modulation schemes to the first laser 110. A constant current is provided in a first modulation scheme. A driving current with a triangular modulation scheme is provided in a second modulation scheme. The evaluator 140 receives electrical signals provided by the first detector 120 which are caused by the first self-mixing interference signal. The first self-mixing interference may comprise a burst of oscillations which may be caused by the presence of a particle in a first focus region 155 of the first laser light. The evaluator 140 further receives information from the electrical driver 130. The evaluator 140 is enabled by means of this information to determine the presence of particles and the corresponding first velocity component of the respective particle. The first laser light emitted by the first laser 110 is focused by means of the first optical device 150 to the first focus region 155. A particle can be detected within a range around the first focus region 155. The arrow indicates a direction of movement of the particles. Determination of only the first velocity component may be suitable in cases in which the direction of movement relative to the beam of the first laser light is known. In this case it is, for example, possible to determine the total speed by means of the first velocity component.

The first optical device 150 may for example comprises only one lens with the defined diameter rlens. The first self-mixing interference signal scales as $(1-\exp[-(\text{rlens}/\text{wpupil})^2])^2$, wherein wpupil is the waist parameter of a Gaussian beam of the first laser light at the lens pupil. The lens should have a certain minimal diameter in order to avoid signal loss due to vignetting of the backscattered or reflected beam of first laser light. A favorable embodiment would have a lens diameter >1.1 pupil diameter (this corresponds to 3 dB signal loss). Even better would be a lens >1.5 pupil diameter of the Gaussian beam (1 dB signal loss).

Figure 4:
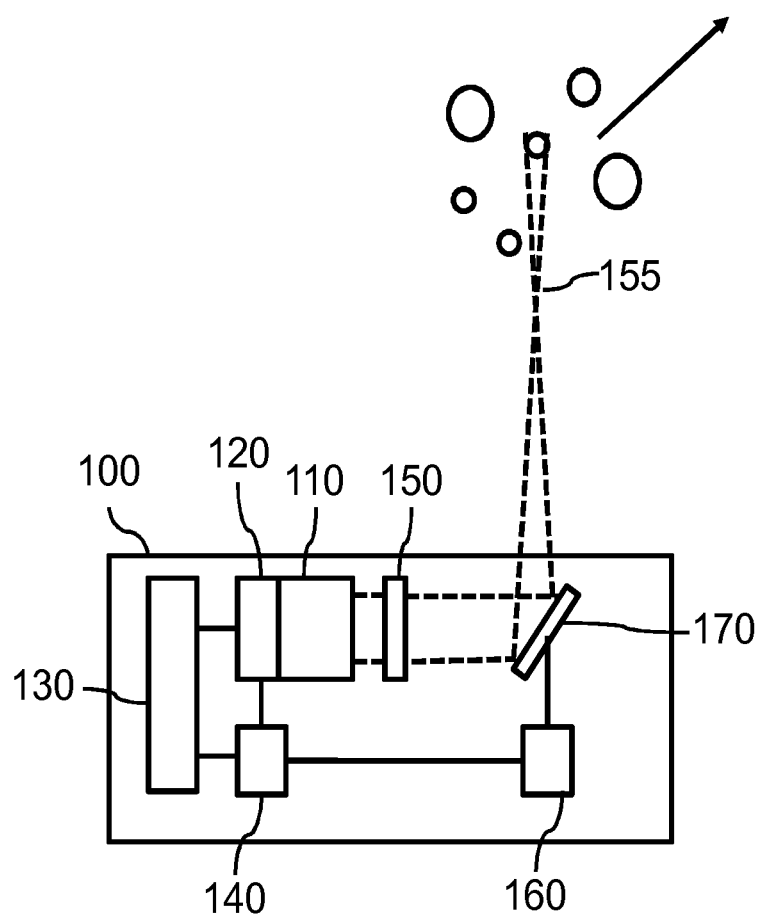

FIG. 4 shows a principal sketch of a fourth laser sensor module 100. The fourth laser sensor module comprises a first laser 110 with an integrated first detector 120. The fourth laser sensor module 100 further comprises an electrical driver 130, an evaluator 140, a first optical device 150, a movable mirror 170 and a controller 160 for controlling the movable mirror 170. The evaluator 140 is connected to the first detector 120, the electrical driver 130 and the controller 160. The electrical driver 130 supplies electrical power to the first laser 110 in order to emit first laser light. Electrical driver 130 provides a constant driving current which is suited to determine the presence of particles and the first parameter being related to the first velocity component of the respective particle. The evaluator 140 receives electrical signals provided by the first detector 120 which are caused by the first self-mixing interference signal. The evaluator 140 further receives information from the electrical driver 130 and the controller 160 in order to interpret the first self-mixing interference signal measured by the first detector 120. The information provided by the electrical driver 130 may comprise the current amplitude. The information provided by controller 160 may comprise angular velocity, amplitude of mirror movement, phase of mirror movement, optionally hold time at different angles and the like. The evaluator 140 is enabled by means of this information to determine the presence of particles and the respective first parameter being related to the first velocity component of the particle. The first laser light emitted by the first laser 110 is focused by means of the first optical device 150 to a first focus region 155 which moves along a scanning direction during the oscillation of the movable mirror 170. A particle can be detected within a range around the first focus region 155.

The particle signal amplitude of the first self-mixing interference signal is an interplay between the numerical aperture of the focused spot (or beam waist of the Gaussian beam) and the mirror movement of movable mirror 170. First the minimal particle size to be detected should be determined. This poses a limit to the maximal noise power that after filtering can be present in the first self-mixing interference signal. As discussed above the relative velocity of spot and particle determines the frequency bandwidth of signal. When the velocity is low the sampled air volume is low, an increase in velocity leads to more sampled volume and hence to more detected particles. The SNR also decreases for larger velocity, but this is unimportant as long as the smallest desired particle is still detectable. The shape of the laser beam also has influence on the sampled air volume; a Gaussian beam with a large waist has a larger diameter and Rayleigh range, yielding more Cross-sectional area than a beam with a small waist (higher numerical aperture). A larger waist also means lower scattered signal as local intensity is lower. This means that a trade of exist between the numerical aperture of the lens used to focus the beam and the relative speed.

In case the air movement is not controlled, and a scanning mirror is used to displace the spot. It may be favorable to choose the velocity higher than normal air speed velocities, 0.1 to 1 m/s. So it would be convenient to have a value of 5-20 m/s. In that case a value of the numerical aperture of the focusing lens of between 0.05-0.2 would be optimal, when particles above 300 nm should be detectable. (numerical aperture is defined using the $1/e^2$ intensity value of the Gaussian beam's far field angular extend).

FIG. 5 shows a first graph showing particle count depending on the phase angle of the movable mirror 170 shown in FIG. 4. The y-axis is the particle number axis 10. The x-axis is a time axis given in mirror cycles of the mirror 170. The dots 30 show the particle count at different times of the mirror cycles or more precisely at different phase angles of the movable mirror 170. At t=0, the speed is largest and most particles are detected. At t=0.25 at the turning point of the mirror, hardly particles will be detected because of the small detection volume.

It has to be mentioned that the measurement points refer to predefined time periods which can be preprogrammed in the evaluator 140. The phase angles therefore always refer to the range of phase angles which is determined by means of the oscillation frequency and the predefined time period.

FIG. 6 shows a second graph showing particle count depending on the phase angle of the movable mirror 170. In case of particle movement (e.g. caused by air movement) parallel with the movement of the oscillating spot or detection volume, this is observed by a shift in the maxima at t=0 and t=0.5. The effective detection volume is increased if the velocity component of the particle parallel to the movement of the detection volume is opposite to the direction of movement of the detection volume caused by movable mirror 170. The effective detection volume is decreased if the velocity component of the particle parallel to the movement of the detection volume directs in the same direction as the direction of movement of the detection volume caused by movable mirror 170 as shown in curves 35 and 33 which show the results with the same velocity but opposite directions. In case of air movement in y or z direction, perpendicular to the movement spot or detection volume (x direction), a vector addition of both velocities occurs in the efficiency of the particle detection, like shown in curve 34.

In the general case the particle movement may have thus a component both parallel and perpendicular to the movement of the spot or detection volume. An example is given by curve 34.

The direction of movement of the detection volume or spot changes in case of an oscillation or rotation of movable mirror 170 around an oscillation axis. It is thus possible because of this known change of the direction to determine a first velocity component parallel to the direction of movement of the detection volume at a given or predefined phase angle or range of phase angles of movable mirror 170 and a second velocity component perpendicular to the direction of movement of the detection volume at the predefined phase angle or range of phase angles of movable mirror 170.

The following algorithm may be used in order to determine the first and the second velocity component, for a linear relationship between the detection volume and the velocity

| # particles = constant * velocity |
|---|
| # = c.v |

| | | | | |
|---|---|---|---|---|
| tmirror | 0.25 cycle | #1 = c. sqrt(vpar^2 + vperp^2) | 1 | |
| tmirror | 0 cycle | #2 = c. sqrt((vmax + vpar)^2 + vperp^2) | 2 | |
| tmirror | 0.5 cycle | #3 = c. sqrt((vmax − vpar)^2 + vperp^2) | 3 | |
| | | 3 equations with 3 unknows (c, vpar and vperp) | | |
| from 1 | (#1/c)^2 = vpar^2 + vperp^2 | | 4 | |
| from 2-3 | (#2^2 − #3^2)/(4c^2) = vmax · vpar | | 5 | |
| 4 and 5 in 2 | #2^2 = c^2(vmax^2 + (#2^2 − #3^2)/(2c^2) + (#1/c)^2) | | | |
| | 0.5#2^2 − #1^2 + 0.5#3^2 = c^2(vmax^2) | | 6 | This solves c |
| | | | | Filling in c in 5 solves vpar |
| | | | | Filling in vpar and c in 1 solves vperp |

Where # is the observed number of counts, (#1 belonging to tmirror=0.25 cycle, #2 belonging to tmirror=0 and #3 belonging to tmirror=0.5 cycle), c is a constant, v is velocity, vpar is velocity parallel to moving spot or detection volume, vperp is velocity perpendicular to moving spot and vmax is the maximum velocity of the moving spot or detection volume (which is known for a certain system design).

The corrected number of particle counts at each phase of movable mirror 170 is now obtained by the absolute value of:

$$\#corr = SQRT((\#/c)^2 - vperp^2) - vpar.$$

The particle density can thus be determined independently from the speed of the fluid comprising the particles. Furthermore, the total velocity of the particles can be determined if the velocity vector of the particles is essentially restricted to 2 dimensions (in general this will be valid for wind speed measurements—anemometer).

FIG. 7 shows a comparison of theoretical and experimental measurement results. The y-axis shows the particle density as counts per second @ PM2.5=1000 μg/m$^3$ and the x-axis is the velocity axis. Curve 61 shows the particle counts as a function of velocity derived by a theoretical model. Curve 61 shows dependence proportional to the cube root of the velocity which is confirmed by curve 60 showing this cube root dependence. The experimental results shown in curve 62 coincide with theoretical data. So, no linear relationship as in the situation of FIG. 6, but the number of particles is proportional to v^0.333. For this situation the correction formula are given by

| #particles scales with v^.333 | | | | |
|---|---|---|---|---|
| tmirror | 0.25 | cycle | #1^3 = c. sqrt(vpar^2 + vperp^2) | 1 |
| tmirror | 0 | cycle | #2^3 = c. sqrt((vmax + vpar)^2 + vperp^2) | 2 |
| tmirror | 0.5 | cycle | #3^3 = c. sqrt((vmax − vpar)^2 + vperp^2) | 3 |
| | | | 3 equations with 3 unknows (c, vpar and vperp) | |
| from 1 | (#1^3/c)^2 = vpar^2 + vperp^2 | | | 4 |
| from 2-3 | (#2^6 − #3^6)/(4c^2) = vmax · vpar | | | 5 |
| 4 and 5 in 2 | #2^6 = c^2(vmax^2 + (#2^6 − #3^6)/(2c^2) + (#1^3/c)^2) | | | |
| | 0.5#2^6 − #1^6 + 0.5#3^6 = c^2(vmax^2) | | | 6 This solves c Filling in c in 5 solves vpar Filling in vpar and c in 1 solves vperp |

The corrected number of particle counts at each phase of movable mirror 170 is now obtained by the absolute value of:

$$\#corr = \sqrt[3]{SQRT((\#^3/c)^2 - vperp^2)} - vpar$$

For other detection schemes other relationships between the number of observed counts and velocity may apply. The corrected number of detected particles can be determined once the correlation between number of particles and velocity is known.

It is thus confirmed that the correction of the particle density data by means of determination of particle counts of particle density at different phase angles of movable mirror 170 can be done.

FIGS. 8 and 9 show another embodiment in which the first self-mixing interference signal may be used to determine a corrected particle density. FIG. 8 shows the first self-mixing interference signal (or a signal which can be extracted from the first self-mixing interference signal) at a velocity of 7 m/s. FIG. 9 shows the first self-mixing interference signal at a velocity of 1 m/s. Furthermore, two calculations are shown in which the first signal 91 refers to a particle which passes the beam of the first laser light at an angle of 90°, and in which the second signal refers to a particle which passes the beam of the first laser light at an angle of 45°. The oscillation pattern shown in FIG. 8 depends on the distance between the particle and focus point or region of the first laser light. The example shown refers to particle which passes the focus point or region through the optical axis and with a distance of 50 μm. The numerical aperture (NA) is 0.1 and the size of the particle is 0.5 μm. The diameter of the focus point of focus region is bigger than the size of the particle. The method may also be adapted in cases that there is a broader distribution of particle sizes. In this case a calibration is needed in order to get reliable results for the first parameter. The frequency components in the oscillations can be detected. Those frequency components are linearly related to the first velocity component. The frequency components may thus be used as first parameter. Though individual particles may give rise to an individual frequency component, averaging the frequency components over many particles gives a good measure for the particle speed or velocity. The average value of the frequency components may this case be used as first parameter. The first parameter which may be determined based on the first self-mixing interference signal as described, for example, in FIG. 8 and FIG. 9.

The first parameter may comprise the duration of the signal (signal related to detection of particle above SNR), phase information and one or more distances between the zero crossings or relative maxima or minima. The number of oscillations, number of relative maxima or minima, number of zero crossings within a defined interval of the first self-mixing interference signal ratio of amplitudes of relative maxima minima and shape of an envelope of the first self-mixing interference signal may be used to determine an angle between the laser beam of the first laser light and the velocity vector of the particle or the particles, In addition the diameter of the spot or focus region may be taken into account. This is further indicated in the two figures above, for a particle passing the beam at 50 micron distance from the spot, both perpendicular to the laser beam (first signal 91 and third signal 93) and with the laser beam at 45 degrees (second signal 92 and fourth signal 94). The speed is 7 m/s (first signal 91 and second signal 92) and 1 m/s (third signal 93 and for the signal 94), respectively. FIG. 8 and FIG. 9 give the oscillations due to the phase effects at the detection of the particles at various positions in the laser beam of the first laser light. Comparison shows that a width of the signal scales linearly with speed or velocity of the particles. Furthermore, the SNR of the signals decreases in case of higher velocity or speed because of the increased noise level at higher velocities. In real life this will not be precisely the case as given by the figures because a filter will not be adapted for the unknown velocity, while the filter is optimized for speed in this calculation. However, in after processing it may be possible to get an estimate of the velocity. This estimate may be used to optimize the filters to obtain the data as presented in the figures. On top of this comes the Doppler frequency due to the moving particle. The Doppler Effect is not present if the velocity of the particle is perpendicular to the laser beam. Average time duration can be used to get an indication of the velocity.

The Doppler Effect adds an additional frequency component, linear with velocity, in case of 45 degrees (not shown). The Doppler frequency in case of 45 degrees and 1 m/s is 1.7 MHz. The Doppler frequency is the highest frequency and can additionally be used to detect the first velocity component in the direction of the laser beam. Using an orthogonal setup, two orthogonal velocity components are derived. This alternative method of determining the first parameter may be used in combination with an optical manipulator like movable mirror or without such an optical manipulator. The moveable mirror may be preferred for increase of the detection volume. Furthermore, the moveable mirror may be used to get information at different angles between the velocity vector of the particles and the beam of the first laser light.

FIG. 10 shows a principal sketch of a fifth laser sensor module 100. The fifth laser sensor module 100 comprises a first laser 110 with an integrated first detector 120 and a second laser 111 with an integrated second detector 121. The first laser 110 and the second laser 111 emit first and second laser light with the same wavelength. In an alternative approach it may also be possible to use different wavelengths. The sixth laser sensor module 100 comprises an electrical driver 130 which is adapted to provide a drive current to the first laser 110 and to the second laser 111. The electrical driver comprises an evaluator 140 which is connected to the first laser 110 and the second laser 111. The sixth laser sensor module 100 further comprises a first optical device 150 for focusing the first laser light to a first focus region 155. The sixth laser sensor module 100 further comprises a second optical device 156 for focusing the second laser light to a second focus region 158. The first laser light and the second laser light are inclined with respect to each other. The first focus region 155 overlaps in this embodiment with the second focus region 158. The evaluator 140 receives electrical signals provided by the first detector 120 which are caused by the first self-mixing interference signal. The evaluator 140 further receives electrical signals provided by the second detector 121 which are caused by second self-mixing interference signal. The evaluator 140 further receives information from the electrical driver 130. The evaluator 140 is enabled by means of this information to determine the presence of a particle and a first velocity component by means of the first self-mixing interference signal. The evaluator 140 is further enabled by means of this information to determine the presence of the particle and a second velocity component by means of the second self-mixing interference signal. Using two inclined laser beams enable to determine two velocity components or a first and a second parameter related to different velocity component of the particle or particles. The laser beams may be inclined by means of the first and second optical device 150, 156 or alternatively by means of positioning of the first and the second laser 110, 111. The beams of the first laser light and the second laser light preferably enclose an angle of 90°. The first and the second velocity component (or the first and the second parameter) are used to correct the particle density depending on the velocity of the particles which is indicated by the arrow.

FIG. 11 shows a principal sketch of a sixth laser sensor module 100. The general arrangement of the sixth laser sensor module is similar as the arrangement shown in FIG. 10. Instead of two lasers a multitude of lasers comprising the first laser 110 are arranged in a linear laser array. Each of the lasers comprises an integrated detector (e.g. first detector 120 of the first laser 110) in order to determine the respective self-mixing interference signal. The electrical driver 130 was adapted to provide a constant drive current to all lasers of the laser array such that detection of particles and detection of velocity component parallel to the respective laser beam emitted by one of the lasers can be detected. The evaluator 140 is adapted to analyze the measurement signals provided by the array of detectors and to assign the measurement signal to the respective detector. The sixth laser sensor module 100 further comprises a first optical device 150 which is adapted to spread the laser beams emitted by the lasers such that the laser beams are directed in different directions. The evaluator 140 comprises a data storage comprising information about the direction of each laser beam relative to the laser sensor module such that each self-mixing interference signal can be used to determine a different velocity component of the velocity of the particles (indicated by the arrow). All or a part of different velocity components are used to correct the particle density determined by means of the sixth laser sensor module 100. In addition a velocity of the particles is determined by means of evaluator 140. An angle of 90° between at least some of the laser beams may be preferred.

FIG. 12 shows the top view of a principal sketch of a seventh laser sensor module 100. The arrangement of the seventh laser sensor module 100 is nearly identical to the arrangement of the sixth laser sensor module 100 shown in FIG. 9. Instead of a linear array of lasers a two-dimensional array of lasers comprising the first laser 110 is used. Each of the lasers comprises an integrated detector. The first optical device 150 is in this case adapted to spread the laser beams in a three-dimensional way. It is thus possible in comparison to a two-dimensional spread as discussed with respect to FIG. 9 to determine a three-dimensional velocity vector. Furthermore, parallel detection of the different self-mixing interference signals increases the effective detection volume and therefore reduces the measurement time to determine the corrected particle density.

Each of the lasers (e.g. first laser 110) indicated in FIG. 9 and FIG. 10 may be replaced by a sub array of lasers or even an array of lasers in order to increase statistics and/or reduce measurement time.

In practice the differences in angles in FIG. 11 and FIG. 12 May be small because of aberrations in a single lens system going to large field/large angles. Using individual lenses in front of individual lasers may thus be a preferred solution. In this way, also for FIG. 11 a three dimensional velocity vector can be determined.

FIG. 13 shows a principal sketch of a mobile communication device 190 comprising a laser sensor module 100. The mobile communication device 190 comprises a user interface 191, a processing device 192 and a main memory device 193. The main processing device 192 is connected with the main memory device 193 and with laser sensor module 100. The main processing device 192 comprises at least a part of the functionalities of evaluator 140 which are described above. The main processing device 192 stores data related to particle detection in the main memory device 193. In an alternative embodiment it may also be possible that the main processing device 192 and the main memory device 193 are only used to prepare or adapt data provided by means of the laser sensor module 100 such that the data can be presented to a user of the mobile communication device 190 by means of user interface 191. The laser sensor module 100 is powered by means of a power supply of the mobile communication device 190. The mobile communication device 190 may further comprise an orientation detection device (not shown). The orientation detection device may, for example, be adapted to determine the relative position of the mobile communication device 190 with respect to ground. The orientation detection device may be coupled with evaluator 140 or the main processing device in order to combine the data provided by means of laser sensor module 100 and data provided by means of the orientation detection device. Coupling of the orientation detection device and the laser sensor module 100 may enable a more reliable detection of wind speed and particle density and may also provide information about wind direction.

FIG. 14 shows a principal sketch of an air conditioning system 200. The air conditioning system 200 comprises an air mover 210 (e.g. fan) a filter system 220 and a laser sensor module according to any one of the embodiments described above. The fan and the filter system 220 are arranged in e.g. a tube in which the air flows. The fan accelerates the air along the axis of the tube such that the direction of movement of the particle is known. The laser sensor module determines particle density and velocity of the particles. The particle density and/or the velocity of the particles may be used in order to determine whether the filter system 220 is contaminated or not. The velocity of the particles may, for example, slow down if the filter system 220 is contaminated. The air conditioning system 200 may in this case be adapted to generate an alert triggering replacement or cleaning of the filter system 220. The air conditioning system 200 may alternatively or in addition be adapted to indicate or provide an information signal whether the particle density is above and/or below a particle density threshold value. The air conditioning system 200 may, for example, be integrated in a vacuum cleaner. The vacuum cleaner may, for example, provide a signal if the particle density is below the particle density threshold value. The user of the vacuum cleaner knows in this case that, for example, a carpet cleaned by means of the vacuum cleaner is clean (at least at the area element cleaned by means of the vacuum cleaner). The air conditioning system 200 may in an alternative embodiment be integrated in an air conditioner. The air conditioner may for example provide a signal if the particle density is above the particle density threshold value (may be a threshold value as the one for the vacuum cleaner). The user of the air conditioner knows in this case that the air which is sucked in by means of the air conditioner may be contaminated. The laser sensor module 100 may preferably receive information from the air mover 210 in order to calibrate the measurements with respect to, for example, the velocity of the air caused by the air mover 210. The air conditioning system may alternatively comprise a processor and corresponding storage devices in order to receive data from the air mover 210 and the laser sensor module 100. The air conditioning system 200 may alternatively or in addition comprise a second laser sensor module 100 (not shown) which is arranged behind filter system 220 (with respect to the particle flow indicated in FIG. 14). The second laser sensor module 100 may enable a more sensitive measurement of the status of the filter system 220. The air conditioning system 200 may further comprise a communication interface enabling access to the data generated by means of the laser sensor module 100.

FIG. 15 shows a principal sketch of the first sensor device 300. The first sensor device 300 comprises an orientation device 330, a laser sensor module 100, a communication interface 310, a rotation axis 320 and a tube through which air comprising particles can flow. The first sensor device 300 may for example be used to determine wind speed and pollution of air (e.g. PM2.5 value). The orientation device 330 is a vane which is adapted to orientate the first sensor device along the wind direction by turning the first sensor device 300 around rotation axis 320. The direction of movement of the particles relative to the first sensor device 300 is thus known as long as it is assumed that the wind direction is parallel to ground. Laser sensor module 100 measures particle density and the wind speed. The laser sensor module 100 is connected with communication interface 310 such that the data related to the corrected particle density and the wind speed is available for other devices. The communication interface 310 is in this case a Bluetooth interface. A user of the mobile communication device with a Bluetooth interface and a corresponding software application is enabled to communicate with the first sensor device 300 via communication interface 310. The user can for example read out particle density and wind speed measured by the first sensor device 300.

FIG. 16 shows a principal sketch of a second sensor device 300. The second sensor device 300 comprises a first laser sensor module 100, a second laser sensor module 100 and a communication interface 310. The second sensor device 300 is arranged parallel to ground. The first laser sensor module 100 emits a beam of first laser light. The second laser sensor module 100 emits a beam of second laser light which encloses an angle of around 90° with the beam of the first laser light. Laser sensor module 100 measures particle density and the wind speed. The laser sensor module 100 is connected with communication interface 310 such that the data related to the corrected particle density and the wind speed is available for other devices. The communication interface 310 is in this case a WLAN interface. The wind speed and particle density measured by the second sensor device 300 can be accessed via the Internet and the WLAN interface which is in communication with a corresponding interface.

A third laser sensor module 100 with a different emission angle of a beam of third laser light may be added to the second sensor device 300 if the direction of fluid or air flow may be three-dimensional. Alternatively, there may be one laser sensor module 100 emitting two or three inclined laser beams as described above.

FIG. 17 shows a principal sketch of a method of particle density detection. In step 410 is first laser light emitted by means of a first laser 110. In step 420 first reflected laser light which is reflected by a particle receiving at least a part of the first laser light is reflected in a first laser cavity of the first laser 110. A first self-mixing interference signal of an optical wave within the first laser cavity of the first laser 110 is detected in step 430. The first self-mixing interference signal is caused by the first reflected laser light reentering the first laser cavity. The first parameter is determined in step 440. In step 450 the particle density is determined based on particle counts detected within a predefined time period by means of the first self-mixing interference signal or signals. The particle density is corrected in step 460 by means of the first parameter.

It is a basic idea of the present invention to detect particles by means of self-mixing interference signals and determine a corresponding particle density. In addition at least one first parameter related to at least one velocity component of the particles is determined in order to correct the particle density if there is a relative movement between a detection volume and the particles. Such a relative movement may for example be related to a velocity of a fluid transporting the particles (e.g. wind speed). Furthermore, it is possible to determine at least one velocity component of the velocity of the particles based on the self-mixing interference signals.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 particle number axis
20 time axis (mirror cycles)
30 particle count over time Vpar=0 and Vper=0 m/s
32 particle count over time Vpar=0 and Vper=3 m/s
33 particle count over time Vpar=3 and Vper=0 m/s
34 particle count over time Vpar=3 and Vper=3 m/s
35 particle count over time Vpar=−3 and Vper=0 m/s
40 particle count axis
50 velocity axis
60 cube root velocity dependence
61 theoretical dependence
62 experimental results
70 time axis
80 SNR axis
91 first signal
92 second signal
93 third signal
94 fourth signal
100 laser sensor module
110 first laser
111 second laser
120 first detector
121 second detector
130 electrical driver
140 evaluator
150 first optical device
155 first focus region
156 second optical device
158 second focus region
160 controller
170 movable mirror
190 mobile communication device
191 user interface
192 main processing device
193 main memory device
200 air conditioning system
210 air mover
220 filter system
300 sensor device
310 communication interface
320 rotation axis of sensor device
330 orientation device
410 step of emitting first laser light
420 step of receiving first reflected laser light
430 step of determining a first self-mixing interference signal
440 step of determining first parameter
450 step of determining particle density
460 step of correcting particle density

The invention claimed is:

1. A laser sensor, the laser sensor comprising:
   at least one first laser;
   at least one first detector;
   at least one electrical driver; and
   at least one evaluator circuit,
   wherein the first laser is arranged to emit first laser light in reaction to signals provided by the at least one electrical driver,
   wherein the at least one first detector is arranged to determine a first self-mixing interference signal of an optical wave within a first laser cavity of the first laser,
   wherein the first self-mixing interference signal is caused by first reflected laser light reentering the first laser cavity,
   wherein the first reflected laser light is reflected by a particle in a fluid receiving at least a part of the first laser light,
   wherein the evaluator circuit is arranged to determine at least one first parameter
   wherein the at least one first parameter is related to a first velocity component of the particle relative to the laser sensor,
   wherein the first velocity component is representative of a velocity of a flow of the fluid,
   wherein the first parameter is determined based on the first self-mixing interference signal,
   wherein the evaluator circuit is arranged to determine a particle density based on the first self-mixing interference signal determined within a predetermined time period, and
   wherein the evaluator circuit is arranged to correct the particle density using the first parameter,
   wherein the laser sensor module is arranged to provide the first self-mixing interference signal for different detection volumes, and
   wherein the evaluator circuit is arranged to determine the first parameter based on the first self-mixing interference signal generated using reflected first laser light reflected at the different detection volumes.

2. The laser sensor according to claim 1, further comprising an optical manipulator, wherein the optical manipulator is arranged to provide the first self-mixing interference signal for the different detection volumes.

3. The laser sensor according to claim 2,
   wherein the optical manipulator comprises a first movable mirror, wherein the first movable mirror is arranged to redirect the first laser light, wherein the evaluator circuit is arranged to determine the first parameter based on the first self-mixing interference signal received at different stages of movement of the first movable mirror.

4. The laser sensor according to claim 3, wherein the first movable mirror is arranged to move around a rotation axis, wherein the evaluator circuit is arranged to determine the first parameter based on the first self-mixing interference signal received at two or more different phase angles of the movable mirror.

5. The laser sensor according to claim 4, wherein the movable mirror is arranged to oscillate with a predefined oscillation frequency around the rotation axis.

6. The laser sensor according to claim 5, wherein the evaluator circuit is arranged to determine the first parameter at three or more different phase angles of the movable mirror.

7. The laser sensor according to claim 6, wherein the evaluator circuit is arranged to determine the first velocity component and a second velocity component of the particle relative to the laser sensor, wherein the determination of the first velocity component and the second velocity component is based on the first parameter.

8. The laser sensor according to claim 1, further comprising at least a second laser, wherein the second laser is arranged to emit second laser light in a second emission direction, wherein the second emission direction is different than a first emission direction in which the first laser light is emitted, wherein the second detector is arranged to determine a second self-mixing interference signal of an optical wave within a second laser cavity of the second laser, wherein the second self-mixing interference signal is caused by second reflected laser light reentering the second laser cavity, wherein the second reflected laser light is reflected by a particle receiving at least a part of the second laser light, wherein the evaluator circuit is arranged to determine at least one second parameter, wherein the second parameter is related to a second velocity component of the particle relative to the laser sensor, wherein the second parameter is determined based on the second self-mixing interference signal, wherein the evaluator circuit is arranged to correct the particle density using the first parameter and the second parameter.

9. The laser sensor according to claim 8, wherein the evaluator circuit is arranged to determine the first velocity component and a second velocity component of the particle relative to the laser sensor, wherein the determination of the first velocity component and the second velocity component is based on the first parameter and the second parameter.

10. The laser sensor according to claim 1, wherein the laser sensor module is arranged to determine an air quality based on the detected particle density.

11. The laser sensor according to claim 10, wherein the detected particle density is characterized by a PM 2.5 value.

12. A mobile communication device comprising at least one laser sensor module according to claim 1.

13. A method of particle density detection in a fluid, the method comprising the steps of:

emitting a first laser light using a first laser, receiving a first reflected laser light in a first laser cavity of the first laser, wherein the first reflected laser light is reflected by a particle in the fluid receiving at least a part of the first laser light;

determining a first self-mixing interference signal of an optical wave within the first laser cavity of the first laser, wherein the first self-mixing interference signal is caused by the first reflected laser light reentering the first laser cavity;

determining based on the first self-mixing interference signal at least one first parameter being related to a first velocity component of the particle relative to the laser sensor, wherein the first velocity component is representative for a velocity of a flow of the fluid;

determining a particle density based on the first self-mixing interference signal determined within a predetermined time period;

correcting the particle density using the first parameter;

providing the first self-mixing interference signal for different detection volumes; and determining the first parameter based on the first self-mixing interference signal generated using reflected first laser light reflected at different detection volumes.

14. A computer program product comprising computer code, wherein the computers code is arranged to perform the method according to claim 13.

15. The method according to claim 13, further comprising providing the first self-mixing interference signal for the different detection volumes using an optical manipulator.

16. The method according to claim 15, wherein the optical manipulator comprises a first movable mirror, wherein the first movable mirror is arranged to redirect the first laser light, wherein the determining of the first parameter is based on the first self-mixing interference signal received at different stages of movement of the first movable mirror.

17. The method according to claim 16, wherein the first movable mirror is arranged to move around a rotation axis, wherein the determining of the first parameter based on the first self-mixing interference signal received at two or more different phase angles of the movable mirror.

18. The method according to claim 17, wherein the movable mirror is arranged to oscillate with a predefined oscillation frequency around the rotation axis.

* * * * *